No. 891,065. PATENTED JUNE 16, 1908.
C. M. HEETER.
DEEP WELL PACKER.
APPLICATION FILED JUNE 17, 1904.
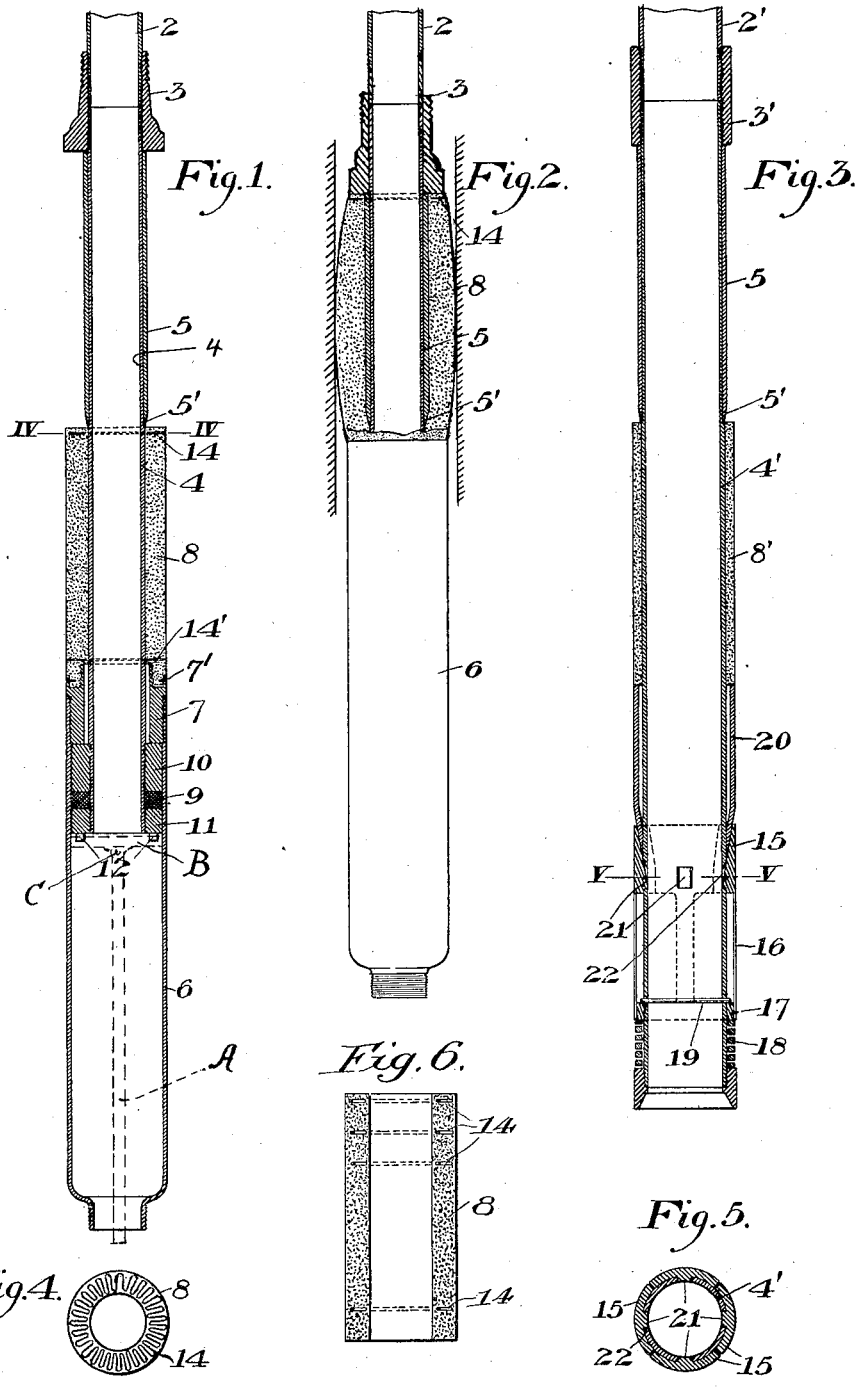
WITNESSES
INVENTOR

UNITED STATES PATENT OFFICE.

CHARLES M. HEETER, OF BUTLER, PENNSYLVANIA.

DEEP-WELL PACKER.

No. 891,065.  Specification of Letters Patent.  Patented June 16, 1908.

Application filed June 17, 1904. Serial No. 212,997.

*To all whom it may concern:*

Be it known that I, CHARLES M. HEETER, of Butler, Butler county, Pennsylvania, have invented a new and useful Deep-Well Packer, of which the following is a full, clear, and exact description, reference being had to the accompanying drawings, forming part of this specification, in which:—

Figure 1 is a vertical axial section of an anchor-packer constructed in accordance with my invention; Fig. 2 is a side elevation partly in section showing the packer when partly set; Fig. 3 is a vertical section showing the application of my invention to a wall-packer; Fig. 4 is a horizontal section on the line IV—IV of Fig. 1 showing the rubber packing ring with embedded strengthening wire; Fig. 5 is a horizontal section on the line V—V of Fig. 3; and Fig. 6, is a vertical section of the rubber packing ring showing several wire coils embedded therein.

The object of my invention is to provide a packer in which the packing ring can be expanded to a larger diameter than has been possible heretofore with rubber rings of the same original diameter. It also provides means by which the slips or wedging devices employed for wedging against the sides of the well and affording resistance to the packer can be expanded to greater diameter than heretofore; and it provides means by which the rubber packing ring will offer greater resistance at its ends to the shoulders by which the packing is done, without being unduly rigid at the intermediate portions.

In the drawings 2 indicates a lower section of a casing or tubing of a well, which is connected by a double screw plug 3 with a sliding section 4, on which is a section 5 of larger diameter tapering at its lower end. The parts 4 and 5 constitute the body of the packer and may be made of a single piece if desired, but I prefer to make them of separate parts and to set one upon the other as shown. The section 4 extends within an anchor-sleeve 6 having at its upper end a collar 7 to which the rubber packing ring 8 is attached by pins 7'. It will here be explained that the internal diameter of the collar 7 is at least equal to or slightly in excess of the external diameter of the enlarged section 5, for a purpose that will be hereinafter explained. The rubber ring encircles the section 4 when the packer is not in the well. The section 4 has at its lower end within the anchor-sleeve a packing gasket 9 which is interposed between two rings 10 and 11. The ring 11 has projections or recesses 12 for engaging a suitable turning tool, so that when the parts have been fitted together as shown in Fig. 1, the ring 11 can be turned and screwed upwardly against the gasket 9, compressing it and expanding it within the sleeve 6 so as to form a packing which will exclude gas from rising between the inner surface of the sleeve and the outer surface of the gasket and thus getting access to the interior of the rubber packing ring 8. Heretofore the distending of the packing ring by gas has been a frequent cause of injury, for the ring is apt to be blown off from the packer, or by pressing frictionally against the well it will disintegrate as the packer is lowered.

In explanation of how the ring 11 may be turned for compressing the gasket 9, I have indicated by dotted lines in Fig. 1 of the drawing a tool or implement for this purpose. This tool includes a handle or shank A carrying a disk-shaped head B, which is centrally hinged to one end of the handle, as shown at C, whereby the head may be folded into substantial parallelism with the handle when it is introduced through the bottom of the anchor sleeve 6. After being introduced into the anchor sleeve, the head is caused to assume a position at substantially right angles to the handle and is moved forwardly until the projections 12 enter suitable sockets or recesses in the head, whereupon the latter may be rotated by manipulating the handle A, so as to screw the ring 11 against the gasket 9, and thereby radially expand the same against the interior of the anchor sleeve 6, so as to form a gas-tight joint.

The ends of the packing ring 8 have coils of wire 14, 14' preferably embedded in the rubber before it is vulcanized. These coils strengthen the ring at the ends and enable it to bear with more substantial resistance against the collar 7 at one end, and against the shoulder 3 at the other end. The packing ring is thus rendered more durable and efficient without impairing the flexibility of its intermediate portions. If desired, however, one or more of these wire coils may be interposed at places along the length of the rubber ring, so that if the rubber should be worn off at the ends, new bearing surfaces would be provided at intermediate points. When the packer is expanded by endwise compression between the parts 3 and 7, the wire will expand with it and will project outwardly somewhat beyond the circumference of these shoulders so as to afford bearing surfaces of increased diameter against which the rubber will be expanded. This produces a more efficient and durable packing than has heretofore been provided.

In the use of my anchor packer it is lowered into the well until the end of the sleeve 6 rests upon the bottom of the hole. The weight of the sections above then pressing down upon the shoulder-section 3 and the body of the packer 4, causes these to move down within the sleeve 6. The first effect of this is to move the section 5 within the rubber ring 8 from end to end thereof and into the collar 7, so that the ring 8 instead of surrounding the section 4 of the packer surrounds the section 5 of increased diameter.

It will now be understood that the internal diameter of the collar 7 is somewhat greater than the external diameter of the section 4 in order that the lower end portion of the larger section 5 may be moved into the collar 7 when the expanding element is moved downwardly, to expand the rubber packing ring 8. The stop 3 then engages the rubber, compresses it endwise and swells it out within the well. In this way, by normally carrying the rubber on a section of smaller diameter, and then introducing within it from end to end a section of increased diameter before the compression is finished, I am enabled to use a packer of relatively small diameter which can be easily inserted in the well, and to expand it to a considerably greater diameter than has heretofore been possible. I thus effect a very great improvement, increasing the efficiency of the packer and its ease of manipulation.

When the packer is being lowered into the well, the compression of the gasket 9 within the sleeve prevents the passage of gas behind the packer and this accomplishes the desirable result which I have mentioned above; and the extensible metal resistance pieces 14, by increasing the area of resistance at the ends of the rubber without impairing the flexibility of the intermediate points, also contributes to the success of the packer. These pieces being vulcanized in the rubber and thus forming part of it will expand with it to any diameter required to make effective contact with the sides of the well. They can be used with advantage in packing rings applied to any of the known forms of packers.

In the construction shown in Fig. 3, I show means by which greatly increased diam eter of expansion of the anchoring slips or wedges can be secured. The upper portion of the wall-packer shown in this figure is substantially the same as the corresponding part of the anchor-packer shown in Fig. 1, the differences being formal and such as are incident to wall-packers. The slips 15 by which the wall-packer is held to afford the necessary resistance for expanding the rubber are carried by flexible arms 16 extending from a sliding ring 17, backed by a spring 18 which is normally held in compression by a frangible disk or pin 19. These slips coact with a conical sleeve 20, and when they are free to ride upwards upon this sleeve they are expanded thereby into contact with the wall of the well and afford a wedging resistance against which the packer is compressed. Other means may be used instead of the spring and frangible disk for the purpose of holding down the slips until time for packing. The slips 15 have inward projections 21 which are adapted to bear on the conical section 20, but when the slips are retracted as shown in Fig. 3, these projections fit within recesses 22 in the body of the packer, and do not spread the slips beyond the limits of the diameter of the packer. When, however, the slips are caused to ride up over the conical section 20, the projections 21 bearing thereon will spread the slips to a greatly increased diameter, and will thus enable them to get a better hold upon the wall and to engage in wells of such large diameter that slips of ordinary construction would fail to secure a hold.

The upper end of the sleeve 20 serves the purpose of the upper end of the collar 7 shown in Fig. 1 of affording a shoulder for the lower end of the rubber ring 8, and the internal diameter of the sleeve 20 is greater than the external diameter of the section 4', whereby the parts are so constructed that the section 5 of increased diameter will enter within the conical section 20 before the rubber ring has been compressed by engagement therewith of the stop shoulder 3' at its upper end. In this way by using a section 4 of relatively small diameter which normally fits within the rubber ring 8', and inserting within the ring a section 5 of larger diameter before the endwise compressing of the rubber is finished, I secure the advantages which I describe above with reference to the corresponding parts in Fig. 1.

It will be understood by those skilled in the art that my device may be modified in many ways and the parts of my invention may be applied to packers of many other constructions. All such variations I intend to include by the following claims.

I claim:—

1. A deep-well packer having an expansible packing-ring, end-shoulders by which it is compressed, and a packer-body having a portion of smaller diameter normally fitting within the ring and a section of increased diameter which enters the ring and extends from end to end thereof before the compression of the ring is completed; substantially as described.

2. A packer for deep wells comprising an expansible packing ring, sections of different diameters slidable within the ring, and a collar to which the packing ring is secured, the packing ring normally embracing the smaller sliding section, and the other section adapted to pass into the packing ring and into the collar before the packing ring is compressed endwise, substantially as described.

3. A deep well packer having an expansible packing ring, a packer body having portions of different diameters adapted to slide within the packing ring, and a seating member for the packing ring, said member having a cylindrical flange of less external diameter than that of the seating member, the packing ring embracing the flange and positively secured to the seating member, substantially as described.

4. A deep well packer having an expansible packing ring consisting of a flexible tube having elastic metallic resistance elements embedded in its end portions and capable of expanding radially with the packing ring, a packer body having portions of different diameters adapted to slide within the packing ring, and a member upon which the packing ring is seated, substantially as described.

5. As a new article of manufacture, a packing ring for packing oil and gas wells comprising a flexible tube capable of endwise compression and also of radial expansion, and having embedded in both end portions a metallic resistance element capable of expanding radially with the radial expansion of the packing ring, substantially as described.

6. A packer for deep wells comprising a sleeve, a packing ring carried by and rising from the sleeve, a sliding section working through the ring and sleeve and adapted to expand the packing ring, a gasket forming a gas-tight joint between the sliding section and the sleeve below the packing ring, and means whereby the gasket may be expanded after the parts are assembled, substantially as described.

7. A packer for deep wells comprising a sleeve, a packing ring carried by and rising from the sleeve, a sliding section working through the ring and sleeve and adapted to expand the ring, a gasket forming a gas-tight joint between the sleeve and sliding section below the packing ring, and a screw ring for expanding the gasket after the parts are assembled, said ring being accessible through the lower end of the sleeve for adjustment when the parts are assembled, substantially as described.

8. A packer for deep wells comprising a collar, an expansible packing ring carried by the collar, differently-diametered sections sliding through the packing ring and the collar, said collar having an internal diameter to receive the larger section and means to compress the packing ring endwise against the collar to radially expand the ring, the packing ring normally embracing the smaller of the aforementioned sections, and the other section being of greater diameter than the first mentioned section and capable of movement into the packing ring and the collar to radially expand the ring before it is compressed between the collar and the compressing means substantially as described.

9. A deep well packer comprising a collar, an expansible packing ring carried by the collar, a tube working endwise through the packing ring and the collar and provided with an externally enlarged portion normally located externally of the packing ring, the collar having an internal diameter to receive the larger portion of the tube, said larger portion capable of moving into the packing ring to radially expand the same, and a shoulder carried by the tube for movement therewith into engagement with the packing ring to compress the same between the collar and the shoulder, the shoulder being located to engage the ring after the enlarged portion of the tube has entered the ring substantially as described.

In testimony whereof, I have hereunto set my hand.

C. M. HEETER.

Witnesses:
 THOMAS W. BAKEWELL,
 H. M. CORWIN.